US008282763B2

(12) United States Patent
Cruickshank et al.

(10) Patent No.: US 8,282,763 B2
(45) Date of Patent: Oct. 9, 2012

(54) MAGNETIC-DIELECTRIC ASSEMBLIES AND METHODS OF FABRICATION

(75) Inventors: Dave Cruickshank, Rockville, MD (US); Tri M. Ly, Spring, TX (US); Jingmin Zheng, Frederick, MD (US)

(73) Assignee: Skyworks Solutions, Inc., Woburn, MA (US)

(*) Notice: Subject to any disclaimer, the term of this patent is extended or adjusted under 35 U.S.C. 154(b) by 0 days.

(21) Appl. No.: 13/087,975

(22) Filed: Apr. 15, 2011

(65) Prior Publication Data

US 2011/0227678 A1 Sep. 22, 2011

Related U.S. Application Data

(63) Continuation of application No. PCT/US2008/086969, filed on Dec. 16, 2008.

(60) Provisional application No. 61/106,841, filed on Oct. 20, 2008.

(51) Int. Cl.
*B29C 65/00* (2006.01)
*B32B 37/00* (2006.01)
*B32B 38/04* (2006.01)

(52) U.S. Cl. ......................... 156/294; 156/250; 156/296

(58) Field of Classification Search .................... 156/60, 156/89.11, 89.12, 89.15, 89.27, 153, 154, 156/242, 245, 250, 272.2, 272.4, 273.9, 293, 156/294, 296, 325, 326, 327, 330; 335/209, 335/296, 297, 301, 302; 523/1, 400
See application file for complete search history.

(56) References Cited

U.S. PATENT DOCUMENTS

| | | | | |
|---|---|---|---|---|
| 4,740,762 | A * | 4/1988 | Powers et al. | 333/1.1 |
| 4,957,812 | A | 9/1990 | Aoki et al. | |
| 4,961,106 | A * | 10/1990 | Butt et al. | 257/710 |
| 4,997,461 | A | 3/1991 | Markhoff-Matheny et al. | |
| 5,712,610 | A * | 1/1998 | Takeichi et al. | 337/290 |
| 5,740,603 | A * | 4/1998 | Kim | 29/830 |
| 6,677,901 | B1 | 1/2004 | Nalbandian | |
| 2002/0160693 | A1 | 10/2002 | Nihonmatsu et al. | |
| 2005/0178098 | A1 * | 8/2005 | Ono et al. | 55/523 |

(Continued)

FOREIGN PATENT DOCUMENTS

EP 1798211 A1 6/2007

(Continued)

OTHER PUBLICATIONS

Zhang et al, "Low-Temperature Sintering and Electromagnetic Properties of Copper-Modified Z-type Hexaferrite", Journal of the American Ceramic Society, 2002, pp. 1180-1184, vol. 85, No. 5, Tsinghua University, Beijing, China.

(Continued)

*Primary Examiner* — Philip Tucker
*Assistant Examiner* — Brian R Slawski
(74) *Attorney, Agent, or Firm* — Lando & Anastasi LLP

(57) ABSTRACT

A method for making a composite magnetic-dielectric disc assembly includes forming a dielectric ceramic annular cylinder, forming a magnetic ceramic rod, assembling the magnetic ceramic rod coaxially inside the dielectric ceramic cylinder, joining the magnetic ceramic rod to the dielectric ceramic cylinder using an adhesive comprising a ceramic material to form a rod-and-cylinder assembly, and slicing the rod-and-cylinder assembly to form a plurality of composite magnetic-dielectric disc-shaped assemblies. The magnetic-dielectric disc assemblies can be used as components of, for example, circulators, isolators, or similar electrical assemblies.

27 Claims, 8 Drawing Sheets

U.S. PATENT DOCUMENTS

| | | | | |
|---|---|---|---|---|
| 2005/0205196 | A1* | 9/2005 | Nozaki et al. | 156/89.11 |
| 2006/0046040 | A1* | 3/2006 | Kameda et al. | 428/212 |
| 2008/0036671 | A1 | 2/2008 | Gonda et al. | |
| 2009/0297432 | A1 | 12/2009 | Hill | |

FOREIGN PATENT DOCUMENTS

| | | | |
|---|---|---|---|
| KR | 1019910006451 | A | 4/1991 |
| KR | 1019940001291 | A | 1/1994 |
| KR | 1020020018186 | A | 3/2002 |
| WO | 9615078 | A1 | 5/1996 |
| WO | 2006064839 | A1 | 6/2006 |
| WO | 2010047723 | A1 | 4/2010 |

OTHER PUBLICATIONS

Nakamura et al., "Control of High-Frequency Permeability in Polycrystalline (Ba,Co)-Z-type Hexagonal Ferrite", Journal of Magnetism and Magnetic Materials, 2003, pp. 158-164, vol. 257, Japan.

Wang et al., "Preparation and Magnetic Characterization of the Ferroxplana Ferrites Ba3Co2-xZnxFe24O41", Journal of Magnetism and Magnetic Materials, 2002, pp. 434-439, vol. 246, Tsinghua University, Beijing, China.

Zhang et al., "Microstructure Characterization and Properties of Chemically Synthesized Co2Z Hexaferrite", Journal of the European Ceramic Society, 2001, pp. 149-153, vol. 21, Tsinghua University, Beijing, China.

Zhang et al., "Microstructure Study and Hyper Frequency Electromagnetic Characterization of Novel Hexagonal Compounds", Microelectronics Journal, 2003, pp. 281-287, vol. 34, Tsinghua University, Beijing, China.

Takada et al., "Crystal and Magnetic Structures and Their Temperature Dependence of CO2Z-Type Hexaferrite (Ba, Sr)3CO2Fe24O41 by High-Temperature Neutron Diffraction", Journal of Applied Physics, 2006, pp. 043904-1-043904-7, vol. 100, American Institute of Physics.

Zhang et al., "Investigation on Physical Characteristics of Novel Z-Type Ba3Co2(0.8-x)Cuo.40Zn2xFe240O41 Hexaferrite", Materials Letters, 2002, pp. 397-403, vol. 56, Tsinghua University, Beijing, China.

Zhang et al., "The Effect on Zn ion Substitution on Electromagnetic Properties of Low-Temperature Fired Z-Type Hexaferrite", Ceremics International, 2002, pp. 917-923, vol. 28, Tsinghua University, Beijing, China.

Tachibana et al., "X-Ray and Neutron Diffraction Studies on Iron-Substituted Z-Type Hexagonal Barium Ferrite: Ba3Co2-xFe24+xO41 (x=0-0.6)", Journal of Magnetism and Magnetic Materials, 2003, pp. 248-257, vol. 262, Kyoto University, Osaka, Japan.

Zhang et al., "Low-Temperature Sintering, Densification, and Properties of Z-type Hexaferrite with Bi2O3 Additives", Journal of the American Ceramic Society, 2001, pp. 2889-2894, vol. 84, Tsinghua University, Beijing, China.

Bao et al., "Dielectric Behavior of Mn-Substituted Co2Z Hexaferrites", Journal of Magnetism and Magnetic Materials, 2002, pp. 131-137, vol. 250, Tsinghua University, Beijing, China.

Wang et al., "Preparation and Characterizations of Ultrafine Hexaganoal Ferrite Co2Z Powders", ScienceDirect, Materials Chemistry and Physics, vol. 77, Issue 1, pp. 248-253, Jan. 2, 2003.

International Search Report and Written Opinion from corresponding International Application No. PCT/US2009/045176 dated Jan. 11, 2010.

Loehman, "Ceramics," vol. 5, pp. 599-633 (publication date unknown).

Baker-Jarvis et al., "Dielectric and Conductor-Loss Characterization and Measurements on Electronic Packaging Materials," NIST Technical Note 1520, Technology Administration, U.S. Department of Commerce, Jul. 2001.

International Written Opinion from corresponding International Application No. PCTIUS2008/086969 dated Feb. 25, 2009.

Zhang et al., "Investigation on Physical Characteristics of Novel Z-Type Ba3Co2(0.8−x)Cuo.40Zn2xFe24O41 Hexaferrite", Materials Letters, 2002, pp. 397-403, vol. 56, Tsinghua University, Beijing, China.

International Preliminary Report on Patentability issued Nov. 30, 2010 and the International Search Report and Written Opinion mailed Jan. 11, 2010 in related International Application No. PCT/US2009/45176.

Loehman, "Ceramics," vol. 5, pp. 599, 602-633 (publication date unknown).

International Preliminary Report on Patentability issued Apr. 26, 2011 and the International Written Opinion mailed Feb. 25, 2009 from corresponding International Application No. PCT/US2008/086969.

* cited by examiner

MAGNETIC-DIELECTRIC ASSEMBLIES AND METHODS OF FABRICATION

CROSS-REFERENCE TO RELATED APPLICATION

This application is a continuation of International Patent Application Serial No. PCT/US2008/086969, filed Dec. 16, 2008 which claims priority to U.S. Provisional Patent Application Ser. No. 61/106,841, titled "MAGNETIC-DIELELECTRIC ASSEMBLIES AND METHODS OF FABRICATION," filed on Oct. 20, 2008, each of which is herein incorporated by reference in its entirety for all purposes.

BACKGROUND OF INVENTION

1. Field of Invention

The present invention is directed to materials and methods for forming ceramic assemblies with adhesive materials having desirable magnetic, abrasive, and thermal properties.

2. Discussion of Related Art

Circulators and isolators are passive electric devices that are used in radio frequency (RF) systems, for example, microwave systems, to permit a signal to pass in one direction while providing high isolation to reflected energy in the reverse direction. Low intermodulation isolators may be used for cellular base station combiners and amplifiers. Circulators and isolators commonly include an assembly comprising a disc-shaped ferrite or other ferromagnetic ceramic element, disposed concentrically within a dielectric annulus. The dielectric annulus is similarly commonly made of ceramic material.

One method of production of such magnetic-dielectric assemblies is to use an organic adhesive to glue a ceramic ferrite rod into a ceramic dielectric tube, followed by cutting using an annular saw. The cut segments are cut oversize then ground to final thickness and flatness. Assemblies using organic adhesives often heat up during machining, causing the adhesive to swell at the cut surface, producing a surface bump and reducing overall surface smoothness, which may affect the performance of devices such as isolators. In addition, softened adhesive may in some cases adhere to portions of the cutting blade, causing it to flex or bend, also reducing the smoothness and/or increasing the variation in thickness of the cut magnetic-dielectric assemblies. Many organic adhesives have a significant high frequency magnetic and/or electric loss tangent.

Another method which may facilitate direct cutting to size of magnetic-dielectric disc assemblies is the use of co-fired assemblies which do not utilize an adhesive. However, co-fired assemblies are not possible for all combinations of dielectric and magnetic materials because of differences in thermal expansion between the two materials.

SUMMARY OF INVENTION

By introducing particles of a material with a relatively high thermal conductivity into an adhesive used to join dielectric and magnetic ceramic materials, heating and swelling of the adhesive during cutting of the dielectric-magnetic assembly may be reduced or eliminated. Transfer of adhesive material to the cutting blade may thus be reduced or eliminated. An adhesive including particles of a material with a higher dielectric constant than that of the adhesive matrix may provide a lower high frequency magnetic and/or electric loss tangent than a conventional epoxy in components of radio frequency systems. Introducing a relatively abrasive, high thermal conductivity particulate material into adhesive may also result in an adhesive with a high thermal conductivity that facilitates dielectric-magnetic assemblies joined therewith to be machined to size directly, without subsequent grinding or lapping to size. In addition to labor savings, there may be an increase in yield of parts from a magnetic rod/dielectric tube assembly from which magnetic-dielectric disc assemblies are cut. In some applications, this increase in yield may be a much as about 30%. There may be a reduction in the insertion loss of a circulator or an isolator formed with magnetic-dielectric disc assemblies according to aspects of the present invention.

In accordance with one embodiment of the present invention there is provided a method for fabricating a magnetic-dielectric assembly. The method comprises applying an adhesive to at least a portion of at least one of an interior surface of a dielectric ceramic annular cylinder and at least a portion of a surface of a magnetic ceramic rod, the adhesive comprising a ceramic material, and assembling the magnetic ceramic rod coaxially inside the dielectric ceramic annular cylinder to form a magnetic-dielectric assembly. Some methods may further comprise providing the dielectric ceramic annular cylinder and/or providing the magnetic ceramic rod.

According to one aspect, the act of applying the adhesive comprises applying an adhesive comprising a matrix having a dielectric constant lower than a dielectric constant of the ceramic material. In some aspects, the matrix may have a thermal conductivity lower than a thermal conductivity of the ceramic material.

In accordance with one or more aspects, the ceramic material comprises powdered alumina and in some aspects, the adhesive further comprises an epoxy matrix. According to some aspects, the powdered alumina comprises substantially spherical particles with a median diameter in a range of from about 0.1 micrometers to about 10 micrometers. According to some aspects, the adhesive comprises from about 0.4 to about 1.2 grams of powdered alumina per gram of adhesive and according to some aspects, the powdered alumina has a purity of greater than about 99%. According to some aspects, the ceramic material has a thermal conductivity in a range of from about 18 W/(m·K) to about 40 W/(m·K). For example, the ceramic material can be about 94% silica with a thermal conductivity of about 18.4 W/(m·K), or in some aspects, a thermal conductivity of about at least 0.08 cal/(sec·cm·K) (at least 33.5 W/(m·K)) or even about 99.5% silica with a thermal conductivity of about 40 W/(m·K).

In accordance with one or more aspects, the method further comprises cutting the magnetic-dielectric assembly to form at least one magnetic-dielectric disc assembly. According to some aspects, cutting the magnetic-dielectric assembly comprises sawing the magnetic-dielectric assembly. In accordance with some aspects, cutting the magnetic-dielectric assembly comprises removing adhesive from a blade of a saw with the ceramic material. According to some aspects, the method comprises selecting the adhesive and ceramic material to provide the adhesive with sufficient thermal conductivity such that cutting the magnetic-dielectric assembly does not result in melting of the adhesive.

According to some aspects, cutting the magnetic-dielectric assembly comprises forming at least one magnetic-dielectric disc assembly having a desired dimensional parameter. According to one or more aspects, the desired dimensional parameter is at least one of thickness, variation in thickness, surface roughness, and circularity. According to some aspects, the at least one magnetic-dielectric disc assembly varies in thickness by less than 0.025 mm after slicing and before any further processing.

According to some aspects, a first surface of the ferromagnetic ceramic disc is coplanar with a first end surface of the dielectric ceramic ring and a second surface of the magnetic ceramic disc is coplanar with a second end surface of the dielectric ceramic ring.

According to some aspects, the method further comprises selecting the adhesive and ceramic material to provide the adhesive with a dielectric constant such that an insertion loss at a frequency of 900 MHz of a microwave isolator comprising the at least one magnetic-dielectric disc assembly is decreased by about 0.2 decibels relative to an assembly of substantially the same materials except having an adhesive free of the ceramic material.

In accordance with another embodiment, there is provided a magnetic-dielectric assembly. The assembly comprises a ferromagnetic ceramic disc coaxially secured within a dielectric ceramic ring by an adhesive comprising a powdered ceramic selected from the group consisting of alumina, titania, silica, and zirconia, although similar low loss dielectric powders could also be used.

In accordance with another aspect, the magnetic-dielectric assembly is mounted in an electrical device coupled to a radio frequency electric circuit. The ferromagnetic ceramic disc typically comprises yttrium-iron-garnet and the dielectric ceramic ring comprises MgO—CaO—ZnO—$Al_2O_3$—$TiO_2$.

In accordance with some aspects, the electrical device is at least one of a circulator and an isolator.

In accordance with another aspect, an electrical device comprising at least one of a circulator and an isolator may be fabricated.

In accordance with another aspect, an electrical device comprising at least one of a circulator and an isolator may be installed into an electrical system.

In accordance with another aspect, an electrical device comprising at least one of a circulator and an isolator may be retrofitted into an existing installation.

In accordance with another aspect, a magnetic-dielectric disc assembly may be retrofitted into an existing isolator or circulator. In accordance with another embodiment, there is provided an adhesive comprising between 0.4 and 1.2 grams of abrasive per gram of adhesive. In accordance with some aspects, the adhesive may further comprise epoxy. In accordance with some aspects, the adhesive is prepared by introducing abrasive into at least one of a resin and a hardener.

In accordance with a further embodiment, there is provided a method of joining a first ceramic component to a second ceramic component. The method comprises applying an adhesive comprising a ceramic material to at least one of a first surface of the first ceramic component and a second surface of the second ceramic component and contacting the first surface of the first ceramic component with the second surface of the second ceramic component. According to some aspects, the method further comprises loading the adhesive with between 0.4 and 1.2 grams of the ceramic material per gram of adhesive. The method may further comprise curing the adhesive.

BRIEF DESCRIPTION OF DRAWINGS

Various aspects of at least one embodiment are discussed below with reference to the accompanying drawings. In the drawings, which are not intended to be drawn to scale, each identical or nearly identical component that is illustrated in various drawings is represented by a like numeral. For purposes of clarity, not every component may be labeled in every drawing. The drawings are provided for the purposes of illustration and explanation, and are not intended as a definition of the limits of the invention. In the drawings.

DETAILED DESCRIPTION

It is to be appreciated that embodiments of the materials, methods, and apparatuses discussed herein are not limited in application to the details of construction and the arrangement of components set forth in the following description or illustrated in the accompanying drawings. The materials, methods, and apparatuses are capable of implementation in other embodiments and of being practiced or of being carried out in various ways. Examples of specific implementations are provided herein for illustrative purposes only and are not intended to be limiting. In particular, acts, elements, and features discussed in connection with any one or more embodiments are not intended to be excluded from a similar role in any other embodiments. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Embodiments and aspects of the present invention are directed to adhesives for joining materials, and in particular, to adhesives for joining dielectric and magnetic ceramic elements to form magnetic-dielectric assemblies, electrical devices incorporating these assemblies, and methods for forming these assemblies.

Figure 1:
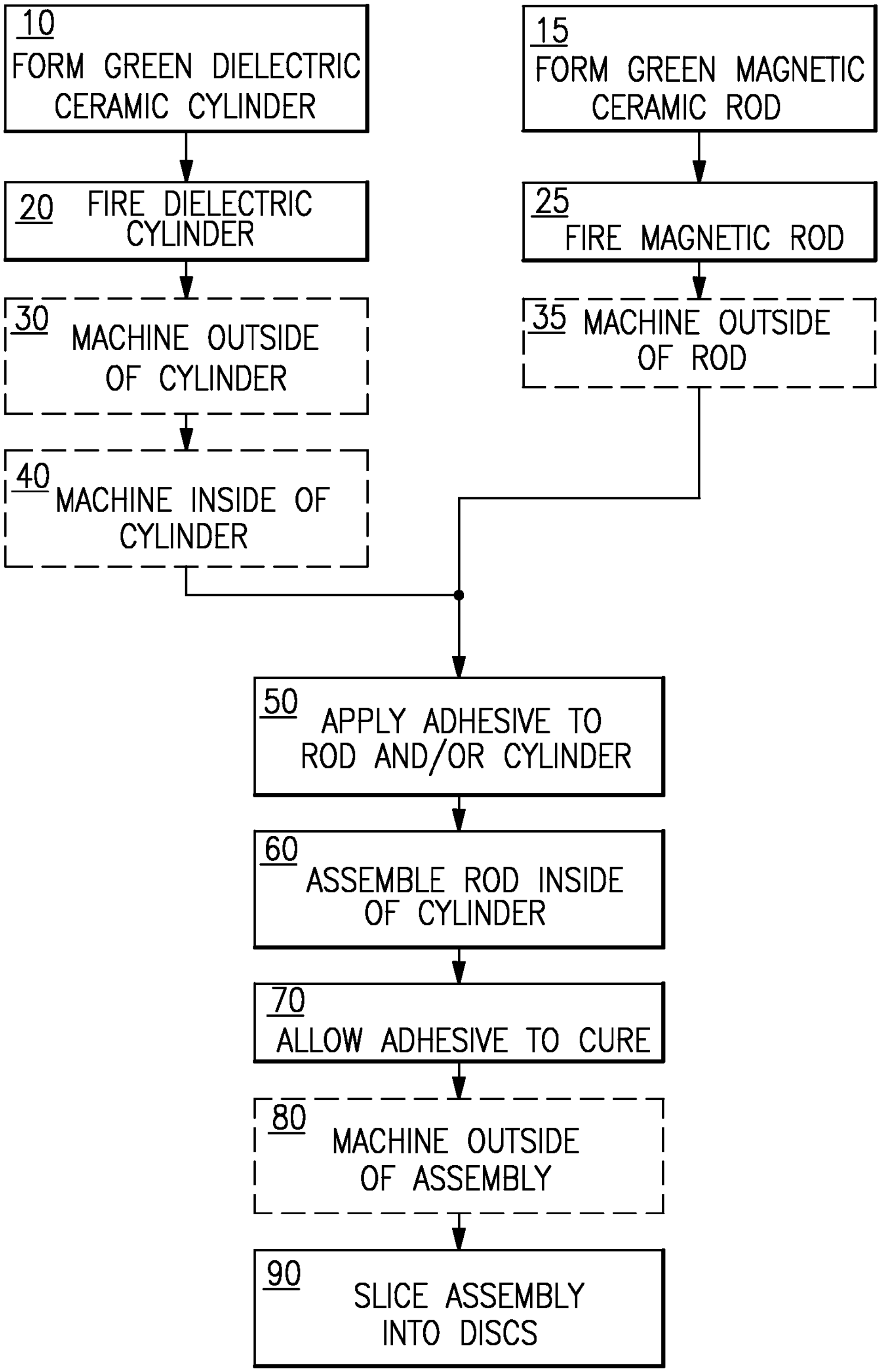
FIG. 1 is a flow diagram of a method for fabricating magnetic-dielectric disc assemblies, in accordance with an embodiment of the present invention.
Figure 2:
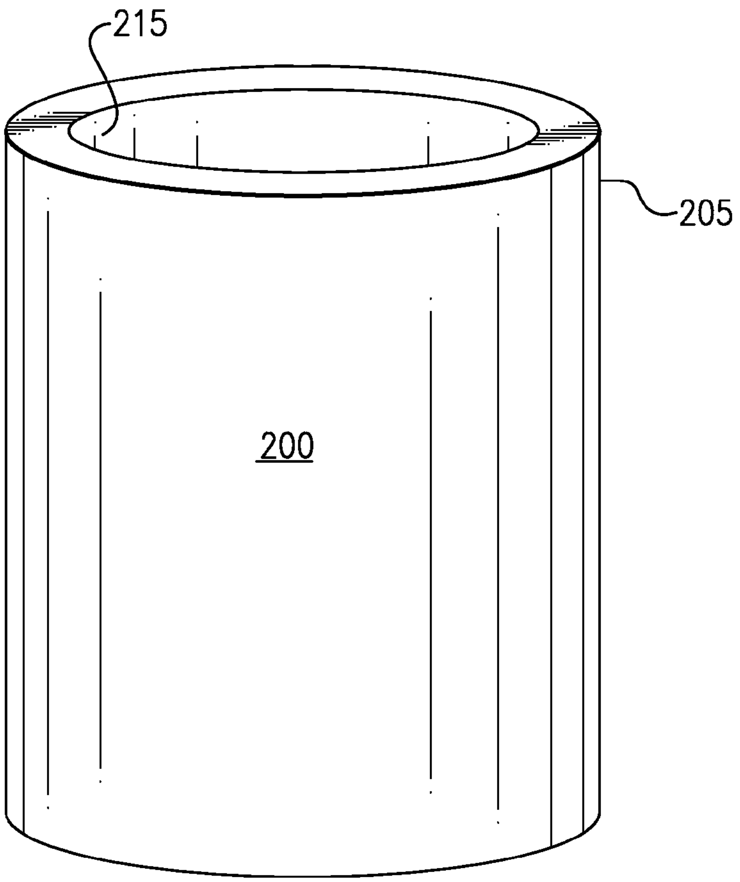
FIG. 2 is a perspective view of a dielectric ceramic annular cylinder, in accordance with an aspect of the present invention.
Figure 3:
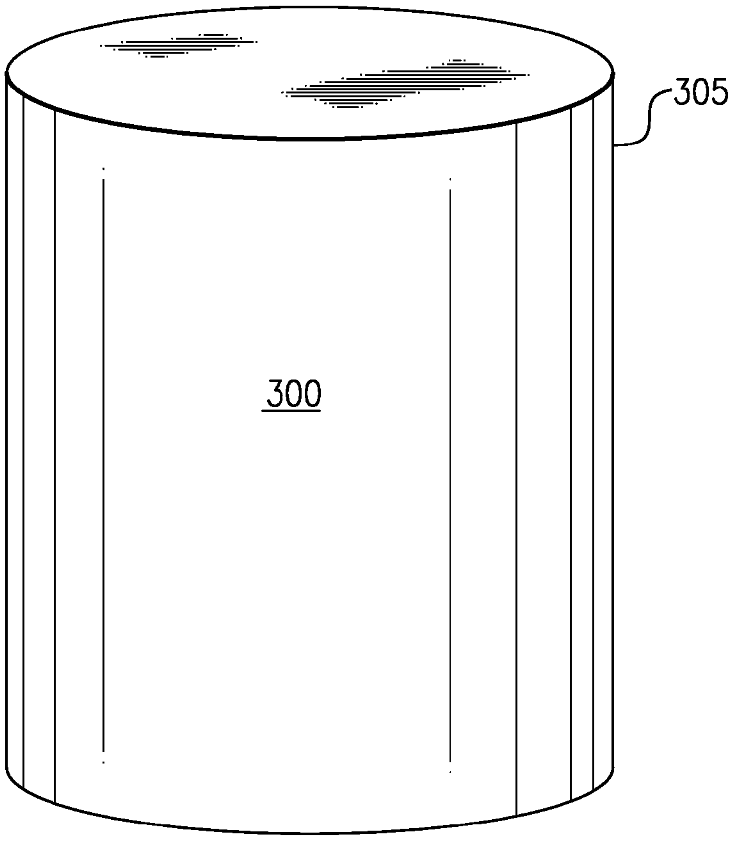
FIG. 3 is perspective view of a magnetic ceramic rod, in accordance with an aspect of the present invention.

A method according to an embodiment of the present invention for making magnetic-dielectric composite disc assemblies is illustrated by the flow diagram of FIG. 1. Illustrated in FIG. 2 is an annular dielectric cylinder 200 according to an aspect of the present invention and illustrated in FIG. 3 is a magnetic ceramic rod 300 according to an aspect of the present invention.

At step 10 of FIG. 1, an annular cylinder is formed from a dielectric ceramic by, for example, filling an appropriately sized mold with hydrated precursors of the dielectric ceramic material, followed by pressing and drying of the material using a suitable metal die set and a hydraulic press. In some aspects, a pressure in a range of between about 500 psi and about 5000 psi may be used to press the material. This dielectric ceramic material may be any dielectric ceramic material that may be used in the construction of magnetic-dielectric composite assemblies, such as, but not limited to, a ceramic material having the composition MgO—CaO—ZnO—$Al_2O_3$—$TiO_2$. At step 20, the unfired or "green" cylinder is then fired. The firing step may include sintering of the ceramic material. This firing step may take place in any suitable firing apparatus, such as, but not limited to, a high temperature oven or a kiln. The temperature ramp rate, the soak temperature, and the time for which the cylinder is fired may be chosen depending on the requirements for a particular application. For example, if small crystal grains are desired in the material after firing, a faster temperature ramp, and/or lower soak temperature, and/or shorter firing time may be selected as opposed to an application where larger crystal grains are desired. In addition, the use of different amounts and/or forms and/or particle sizes of precursor materials may result in different requirements for parameters such as temperature ramp rate and soaking temperature and/or time to provide desired characteristics to the post-heated cylinder. Sintering of the cylinder may be performed at a suitable or desired temperature and for a time period sufficient to provide one or more desired characteristics, such as, but not limited to, crystal grain size, level of impurities, compressibility, tensile strength, density, or porosity. For example, a material having the composition MgO—CaO—ZnO—$Al_2O_3$—$TiO_2$ may be fired at a temperature of about 1310° C. for a time period of between about two and about 12 hours, and in one aspect for about six hours.

At step 30, the outside surface 205 of the cylinder 200 may be machined to a desired outside diameter and/or desired degree of circularity and/or a desired smoothness. At step 40, the inside surface 215 of the cylinder 200 may similarly be machined to a desired inside diameter and/or desired degree of circularity and/or a desired smoothness. In some embodiments, it may be desirable to impart a similar degree or circularity and/or smoothness to both outside surface 205 and inside surface 215 to, for example, facilitate the centering of a rod within cylinder 200. In other embodiments, it may be desirable to impart a different degree or circularity and/or smoothness to outside surface 205 and inside surface 215 to, for example, accommodate applications calling for a non-circular external surface, or to facilitate adhesion of an object to external surface 205 or to internal surface 215. The preferred dimensions for the rod depend on the application, but in some aspects are in the range from about 10 mm to about 40 mm in diameter, and from about 15 mm to about 40 mm in length. The tube inside diameter and length may correspond to the rod diameter and length, with a wall thickness of up to about 5 mm in some aspects. It should be appreciated that steps 30 and 40 may be performed in the reverse order, or combined as a single step.

Returning to FIG. 1, at step 15, a rod 300 is formed from a magnetic ceramic material using, for example, a method such as is described in co-pending U.S. patent application Ser. No. 12/130,800 entitled "Enhanced Hexagonal Ferrite Material and Methods of Preparation and Use Thereof," incorporated herein by reference in its entirety for all purposes. The rod 300 may be formed from any suitable magnetic ceramic material, such as yttrium-iron-garnet (YIG), or any other suitable ferrimagnetic garnet or spinel.

At step 25, the unfired or "green" rod is then fired. The firing step may include sintering of the ceramic material. This firing step may take place in any suitable firing apparatus, such as, for example, a high temperature oven or a kiln. The firing temperature and duration may vary for a particular application depending on factors similar to those discussed above with regard to the ceramic cylinder, such as, but not limited to, the type of material selected, desired porosity, the form and/or size of precursor material particles, if any, that are used, the desired grain size, and the desired density. For example, a YIG material may be fired at a temperature in a range of from about 1300° C. to about 1500° C., e.g., 1310° C., for a time period of between about two and about twelve hours, and in some aspects for about eight hours. Some of the above listed factors may also vary as a result of the pressure at which the pre-fired rod may have been pressed in step 15. For example, if a green YIG rod is pressed at a pressure of about 5000 psi before firing, it would have a lower porosity after firing than if it had been pressed at about 500 psi before firing.

At step 35, the outer or outside surface 305 of the rod 300 may be machined to a desired diameter, degree of circularity, and smoothness. In some aspects, all dimensions are measured using standard micrometers with an accuracy of about 0.0025 mm in dimensions. In some aspects, surface roughness is measured by comparison to standard surfaces, with a surface roughness in the range from about 0.1 micrometers to about 1 micrometer. The degree of circularity of the outer surface 305 of the rod 300 may be similar to that of the inside surface 215 of annular cylinder 200 in order to, for example, facilitate centering of rod 300 within annular cylinder 200. The degree of circularity of the outer surface 305 of the rod 300 may be similar to that of the inside surface 215 of annular cylinder 200 in order to, for example, facilitate centering of rod 300 within annular cylinder 200. The degree of smoothness of the outer surface 305 of the rod 300 may be similar to or different from that of inside surface 215 and/or outside surface 205 of annular cylinder 200 depending upon, for example, the type of adhesive that might be used to secure the rod 300 inside the cylinder 200 and how surface roughness affects the strength of adhesion for that adhesive. The diameter of the rod may be slightly smaller, for example, between 0 mm and 0.025 mm less than the inside diameter of the annular cylinder so that the rod can be fitted within the cylinder, as described below, to give a close fit. Both the outer surface 305 of the rod 300 and the inside surface 215 of the cylinder 200 may be machined to precise tolerances, in some aspects with a tolerance of about 0.005 mm, measured using suitable micrometers, in order to promote adhesion between the rod and cylinder and to facilitate coaxially centering and aligning the rod within the cylinder. This will also facilitate concentricity of the assembly. In some aspects, the surfaces of the tube and rod are cleaned ultrasonically in a suitable medium prior to assembly.

At step 50, an adhesive is applied to at least a portion of one or both of the outer surface 305 of the rod 300 and the inside surface 215 of the annular cylinder 200 using a suitable adhesive dispenser or syringe.

The adhesive may be selected based on a number of criteria, for example, strength, heat resistance, conductivity, curing/drying time, viscosity, water resistance, biodegradability, and ease of incorporation of or carrying capacity for a selected ceramic powder. The adhesive may be selected from a group of adhesives that may cure in the absence of air to facilitate drying of adhesive in areas such as within an assembled rod and cylinder assembly where air may not be able to reach. In some aspects, the adhesive may be an epoxy to which at least one ceramic material has been added by, for example, mixing a powdered form of the at least one ceramic material into the epoxy resin and/or the epoxy hardener prior to the mixing of the resin and hardener using either manual blending with a spatula or similar instrument, or a blending machine. A suitable epoxy may be, for example a room temperature curing resin available from Ciba Specialty Chemicals or Dow Corning. Other adhesives that may be used include silicone or urethane based materials. The ceramic material may be added in a quantity in a range of from about 0.4 to about 1.2 grams per gram of adhesive to form a loaded adhesive. If too little ceramic material is added to the adhesive, for example, less than about 0.4 grams ceramic per gram of adhesive, the loaded adhesive may exhibit heating and swelling during subsequent cutting of an assembly joined with the loaded adhesive. The dielectric constant of the loaded adhesive may also be insufficiently modified from that of the unloaded adhesive matrix if insufficient ceramic material is added. If too much ceramic material is added to the adhesive, for example, more than about 1.2 grams per gram of adhesive, the loaded adhesive may be less effective at maintaining adhesion between components; and some of the ceramic material may be insufficiently bound within the loaded adhesive matrix and may subsequently escape therefrom. The ceramic material may be in the form of a powder. The powder may comprise substantially rounded particles with a median diameter in a range of between about 0.1 microns and about 10 microns, elongated particles having dimensions of approximately 2 microns long by 0.5 microns wide, plate-like particles having dimensions of approximately 2 microns across and 0.5 microns thick or combinations thereof. In some aspects these particle sizes may be measured using particle size measurement equipment such as a laser anaeometer. One or more physical dimensions of the particles of the powder may vary by up to about 5 microns above and/or below the median. The ceramic material may comprise materials such as, but not limited to, alumina, titania, silica, or similar low dielectric loss materials, or combinations thereof. The ceramic material may have a purity of greater than about 99%. The ceramic material may have a different thermal conductivity and/or dielectric constant than the epoxy or other adhesive matrix into which it is mixed. The ceramic material may have a different hardness and/or abrasiveness than the epoxy or other adhesive matrix into which it is mixed. A particular adhesive matrix and a particular type and quantity of ceramic loading may be selected to tailor properties of the loaded adhesive, such as dielectric constant, adhesiveness, magnetization, and electrical permittivity as desired. In some aspects a loading which facilitates mixing and application (viscosity) and curing time (between about 5 minutes and about 15 minutes) is about 0.6 grams abrasive per gram of adhesive.

Figure 4:
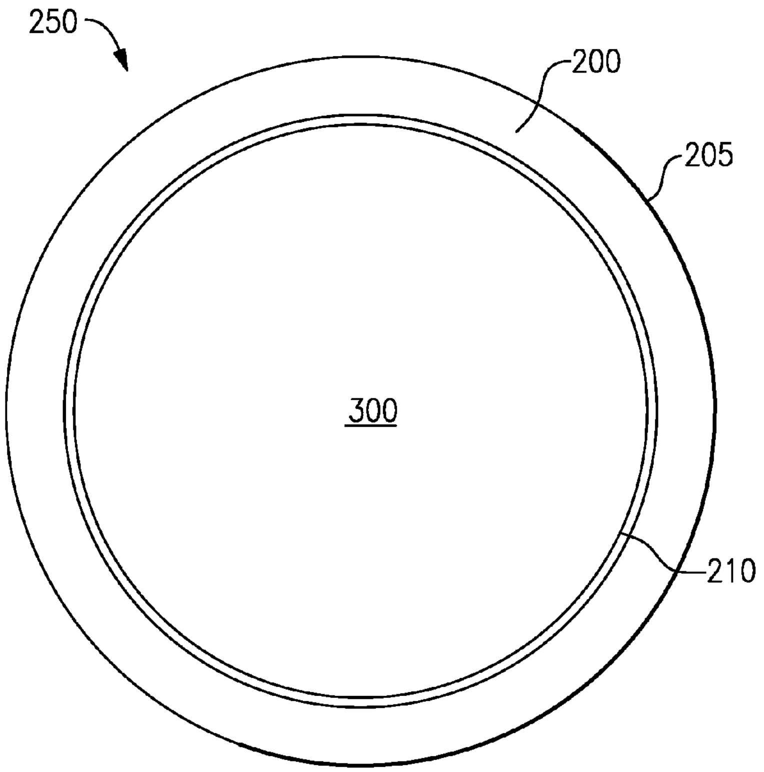
FIG. 4 is a top plan view of a rod-and-cylinder assembly, illustrating the rod of FIG. 3 inserted in the cylinder of FIG. 2.

At step 60, the rod 300 is inserted inside the annular cylinder 200 to form a rod-and-cylinder assembly, such as the magnetic-dielectric rod-and-cylinder assembly 250 illustrated in FIG. 4. A gap 210 may exist between the outer surface 205 of the rod 200 and the inner surface 215 of the annular cylinder 200 which may be filled with loaded adhesive upon the insertion of the rod 300 into the cylinder 200. The width of gap 210 may be about as large as or larger than the largest cross-sectional dimension of the ceramic powder particles in the loaded adhesive, in one aspect about 10 microns or greater.

The loaded adhesive is allowed to cure (harden), as indicated by step 70. The time required for the loaded adhesive to cure may depend upon the type of adhesive matrix and ceramic loading selected. In some aspects, heat may be applied in the form of, for example, hot air to the magnetic-dielectric rod-and-cylinder assembly 250 to facilitate the curing of the loaded adhesive. In some aspects a cure time is about 5 minutes. At step 80, the outside surface 205 of the magnetic-dielectric rod-and-cylinder assembly 250 may be again machined to a desired diameter and/or smoothness and/or degree of circularity. It should be noted that in some methods, step 30 may be performed along with, or in place of step 80 at this point on the cured rod-and-cylinder assembly 250, rather than earlier in the process.

Figure 5:
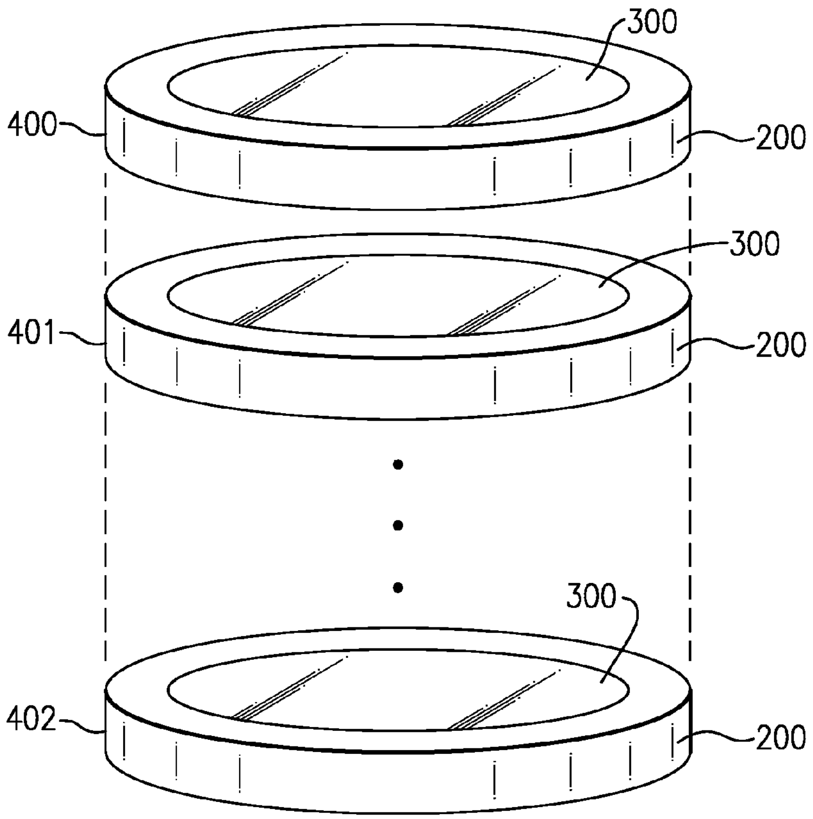
FIG. 5 is a perspective view of a plurality of magnetic-dielectric disc assemblies cut from a rod-and-cylinder assembly in accordance with an aspect of the present invention.

At step 90, the magnetic-dielectric rod-and-cylinder assembly 250 may be cut into a number of disc assemblies 400, 401, 402, as are illustrated in FIG. 5. The magnetic-dielectric rod-and-cylinder assembly 250 may be cut using a saw such as an annular inside diameter saw or an outside diameter saw, using diamond or silicon carbide impregnated blades, or may be cut in an alternate manner, such as by water jet or laser cutting.

The description of the method above is not meant to be limiting. In some methods according to the present invention, some of the steps described above may be combined, performed in alternate order, or even eliminated. For example, in some aspects of the invention, one or more of the machining steps 30, 35, 40, or 80 may be eliminated if the as-formed rod 300 and/or cylinder 200 have surfaces of acceptable diameters and/or smoothness and/or degree of circularity, such as better than 1 micron surface finish and roundness of 0.025 mm, and diameters in the range 10 mm to 40 mm Further, additional steps not explicitly described may be included in aspects of methods according to the present invention. For example, additional machining or polishing steps may be included if a magnetic-dielectric assembly shaped other than as a flat disc is desired.

The present invention is not limited to the joining of magnetic ceramic rods within dielectric cylinders. Dielectric materials and magnetic materials of any desired shape may be joined with a loaded adhesive according to aspects of the present invention. For example, a dielectric disc may be joined between two conductive discs with a loaded adhesive according to aspects of the present invention to form a capacitor. A loaded adhesive according to aspects of the present invention may also be used to join non-dielectric and/or non-magnetic materials including metals and/or ceramics and/or polymers to like materials or to different types of materials.

The high thermal conductivity of the ceramic material in the loaded adhesive according to some aspects of the present invention may reduce or eliminate the tendency of the adhesive to melt or swell as a magnetic-dielectric rod-and-cylinder assembly 250 or other assembly including the loaded adhesive is cut or sawed or otherwise machined. This may reduce or eliminate the tendency of the adhesive to escape from interfaces between joined components and deposit on a saw blade used to slice the assembly and/or form bumps on the surfaces of discs or other components formed from the assembly.

Further aspects of the invention can involve a loaded adhesive tailored to have one or more properties that are within an acceptable tolerance of a property of one of the cylinder and rod. For example, the dielectric property of the loaded adhesive can be within a tolerance value of less than about 50% of the dielectric property of the cylinder. Preferred embodiments, however, may involve a tolerance of less than 25% of the dielectric property of the cylinder or the rod. Thus, depending on a use or application of the magnetic-dielectric assembly, the loaded adhesive can be formulated with one or more ceramic materials that results in a loaded adhesive having one or more desired properties. The law of mixtures can be used to facilitate characterization of the one or more desirable properties. Other approximation techniques, such as the log mixing rule can be used to provide an estimate of, for example, the resultant, typically derived, dielectric property.

Adhesive that adheres to the saw blade used to cut an assembly including the loaded adhesive may be removed by contact with the ceramic material in the loaded adhesive as the assembly is further cut. Thus, loaded adhesive may both reduce the likelihood of adhesive accumulation on a saw blade and facilitate the removal of adhesive accumulation that does occur. Removing deposited adhesive from the saw blade may reduce or eliminate the tendency of the saw blade to flex or bend, which may extend the life of the saw blade and/or reduce variation in thickness of the discs or other components cut from the assembly. For example, disc assemblies produced by methods according to aspects of the present invention may have a thickness of between about 1 mm and about 10 mm with a thickness variation of less than 0.025 mm.

Reduction in the variation in thickness of the discs or other components formed from for example, a rod-and-cylinder assembly, may reduce or eliminate the need for a polishing or grinding step after the cutting step, which may be necessary in some conventional methods, to remove glue bumps and/or to grind the discs or other components cut from the assembly, to a desired thickness and/or smoothness. This grinding step may be necessary when utilizing an adhesive not containing ceramic material to join for example, a ceramic magnetic rod and ceramic dielectric annular cylinder. In some aspects of methods according to the present invention, the reduction in or elimination of the grinding step enabled by the utilization of an adhesive containing a ceramic material may result in an increase in product yield and/or material savings. For example, up to about 30% of the material of a ceramic magnetic rod and ceramic dielectric cylinder may be lost due to grinding and/or polishing that may be needed to establish acceptable disc thickness and smoothness in some methods utilizing an adhesive not containing a ceramic material. This material loss may be reduced or eliminated by the utilization of methods according to the present invention which may allow for the elimination of the grinding step or the reduction of the amount of grinding required. In some aspects, grinding is carried out using a commercial surface grinder with a silicon carbide or diamond wheel. In other aspects, a commercial lapping machine using a silicon carbide abrasive powder in slurry form is utilized.

In some aspects of methods according to the present invention, a grinding step may still be desired to be performed after a cutting step to create a desired shape and/or profile in components cut from an assembly joined by the loaded adhesive. In some of these aspects, ceramic material with which the adhesive has been loaded may be released during this grinding step, and reduce the time required to complete the grinding step by acting as abrasive that facilitates the grinding operation.

According to some aspects, each disc assembly cut from a magnetic-dielectric rod and tube assembly may comprise a magnetic ceramic disc disposed concentrically within a coplanar dielectric ceramic ring and joined to the ring by a layer of adhesive comprising a ceramic material. In some aspects, devices such as high frequency circulators or isolators constructed using magnetic-dielectric composite disc assemblies according to aspects of the present invention may exhibit lower insertion loss than do circulators or isolators constructed using conventional techniques, such as techniques utilizing magnetic-dielectric composite disc assemblies including an adhesive that does not contain a ceramic material. This insertion loss reduction may be as much as about 0.2 dB at 900 MHz for each circulator or isolator, typically relative to an assembly of substantially the same materials except having an adhesive free of the ceramic material.

Figure 6:
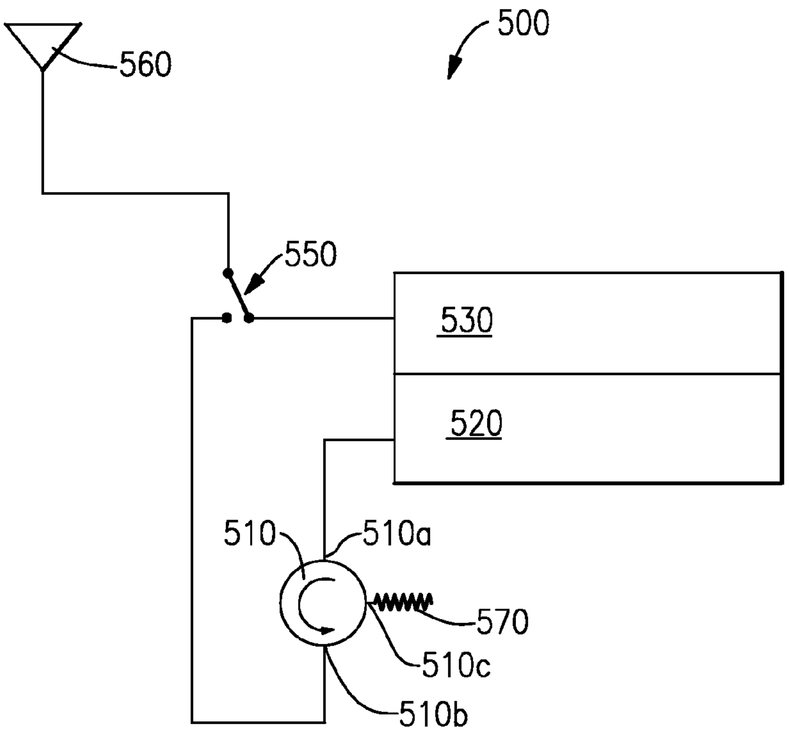
FIG. 6 is a schematic view of a radio circuit including an isolator in accordance with an aspect of the present invention.

For example, a radio transceiver 500, such as that illustrated schematically in FIG. 6 may have its performance enhanced through the use of a low-loss isolator according to aspects of the present invention. Referring to FIG. 6, the radio transceiver configured for duplex operation includes a transmitter 520, a receiver 530, and a switch 550. Isolator 510 is typically a one-way device which may facilitate reduction in the amplitude reflected power or of extraneous signals that might be captured by antenna 560 and travel toward the transmitter 520. In the illustrated example, isolator 510 comprises a circulator including a load 570 coupled to the port 510*c*. Isolator 510 is typically configured such that signals from transmitter 520 entering input port 510*a* mostly exit output port 510*b* and proceed to antenna 560, and signals entering output port 510*b* from the antenna 560 mostly exit load port 510*c* and are dissipated in load 570 as heat. Signal propagation from port 510*b* to port 510*a* and from port 510*a* to port 510*c* is highly attenuated. The use of isolator 510 reduces the likelihood of undesirable mixing of signals inside transmitter 520 which could generate interference.

The combination of a circulator and a load coupled to one port becomes a device such as isolator 510 that may conduct RF power in a forward direction from a transmitter 520 output to an antenna 560 with a low loss of power due to attenuation. Any RF signal that may be reflected from the antenna 560 due to impedance mismatch or de-tuning, or coupled into the antenna 560 from an adjacent transmitting antenna will be presented with a high loss path toward the transmitter 520 and a low loss path toward the load 570. Reflected power is thus prevented from reaching the transmitter 520 where it might impair the performance of the transmitter's amplifier stage. In the case of a coupled signal, mixing in the transmitter's preamplifier stage is controlled to reduce or eliminate signals known as intermodulation.

Figure 7:
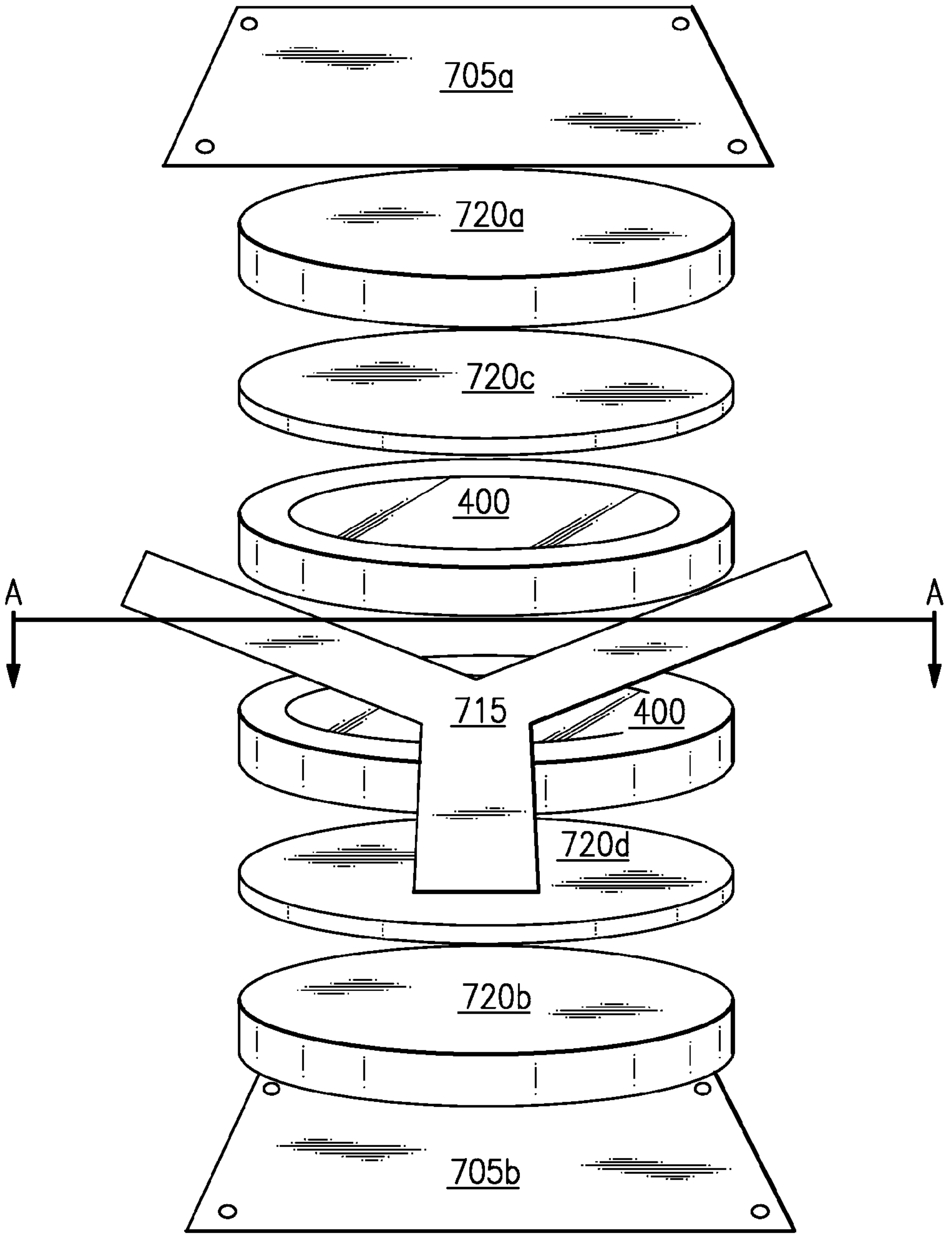
FIG. 7 is a partial exploded view of a circulator in accordance with an aspect of the present invention.
Figure 8:
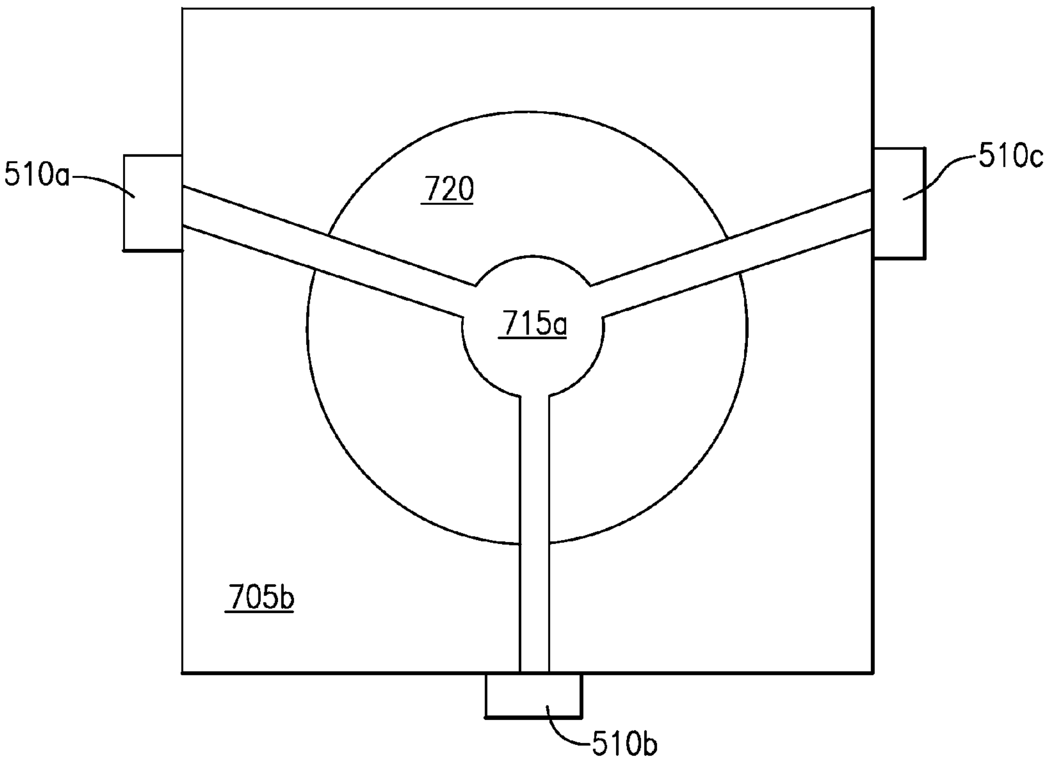
FIG. 8 is a cut away plan view of a circulator similar to that of FIG. 7 along line A-A.

The structure of one example of an isolator 510 according to an aspect of the present invention is illustrated in FIG. 7 and FIG. 8. FIG. 7 is a simplified exploded view of isolator 510 according to some aspects of the present invention illustrating an example organization of the component elements. The isolator 510 includes upper and lower pole pieces/casing elements 705*a* and 705*b*, between which are stacked an upper magnet 720*a*, a lower magnet 720*b*, an upper magnet ground plate 720*c*, a lower magnet ground plate 720*d*, upper and lower magnetic-dielectric disc assemblies 400, and a "Y" junction center conductor 715. In one example, magnetic-dielectric disc assemblies 400 are magnetic-dielectric disc assemblies formed by a method according to the present invention, as discussed above.

FIG. 8 is a plan view of the isolator 510 of FIG. 7, viewed cut away through line A-A of FIG. 7. For simplicity, elements 720*b*, 720*d*, and lower magnetic-dielectric disc assembly 400 are represented collectively by disc 720. Another possible configuration of "Y" junction center conductor 715*a* is shown connected to three ports 510*a*, 510*b*, and 510*c*. Isolator 510 could be inserted into an RF circuit as illustrated in FIG. 6.

Magnetic-dielectric composite disc assemblies formed by methods according to aspects of the present invention may be installed or mounted into an electrical device as part of the fabrication of that device. The electrical device may in some aspects be an RF circulator or RF isolator.

RF isolators and/or RF circulators according to aspects of the present invention may be installed into an electrical circuit such as an RF electrical circuit, or an RF circuit may be retrofitted to include one or more circulators and/or isolators according to aspects of the present invention.

Magnetic-dielectric composite disc assemblies that had been manufactured using different methods and installed in electric devices, such as RF circulators or RF isolators, may be replaced by magnetic-dielectric composite disc assemblies formed by methods according to aspects of the present invention in order to enhance the performance of the electric devices by, for example, reducing the insertion loss of the devices.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method for fabricating a magnetic-dielectric assembly comprising acts of:

applying an adhesive including a ceramic material in an epoxy matrix to at least a portion of at least one of an interior surface of a dielectric ceramic annular cylinder and at least a portion of a surface of a magnetic ceramic rod; and assembling the magnetic ceramic rod coaxially inside the dielectric ceramic annular cylinder to form the magnetic-dielectric assembly.

2. The method of claim 1 wherein the epoxy matrix has a dielectric constant lower than a dielectric constant of the ceramic material.

3. The method of claim 1 wherein epoxy matrix has a thermal conductivity lower than a thermal conductivity of the ceramic material.

4. The method of claim 1 wherein the ceramic material includes powdered alumina.

5. The method of claim 4 wherein the powdered alumina includes substantially spherical particles with a median diameter in a range of from about 0.1 micrometers to about 10 micrometers.

6. The method of claim 4 further comprising an act of selecting an adhesive including from about 0.4 to about 1.2 grams of powdered alumina per gram of adhesive.

7. The method of claim 4 wherein the powdered alumina has a purity of greater than about 99%.

8. The method of claim 1 further comprising an act of cutting the magnetic-dielectric assembly to form at least one magnetic-dielectric disc assembly.

9. The method of claim 8 wherein the act of cutting the magnetic-dielectric assembly includes sawing the magnetic-dielectric assembly.

10. The method of claim 8 wherein the act of cutting the magnetic-dielectric assembly includes removing adhesive from a blade of a saw with the ceramic material.

11. The method of claim 8 wherein the act of cutting the magnetic-dielectric assembly includes forming at least one magnetic-dielectric disc assembly having a desired dimensional parameter.

12. The method of claim 11 wherein the desired dimensional parameter is at least one of thickness, variation in thickness, surface roughness, and circularity.

13. The method of claim 11 wherein the at least one magnetic-dielectric disc assembly varies in thickness by less than 0.025 mm after cutting and before any further processing.

14. The method of claim 8 further comprising an act of selecting the epoxy matrix and the ceramic material to provide the adhesive with a dielectric constant such that an insertion loss at a frequency of 900 MHz of a microwave isolator including the at least one magnetic-dielectric disc assembly is decreased by about 0.2 decibels relative to an assembly of substantially the same materials except having an adhesive free of the ceramic material.

15. The method of claim 8 further comprising an act of selecting the epoxy matrix and the ceramic material to provide the adhesive with sufficient thermal conductivity such that during cutting of the magnetic-dielectric assembly the adhesive does not melt.

16. The method of claim 1 wherein the ceramic material has a thermal conductivity of at least 0.08 cal/(sec·cm·K).

17. The method of claim 1 wherein the magnetic ceramic rod includes yttrium-iron-garnet and the dielectric ceramic annular cylinder includes $MgO—CaO—ZnO—Al_2O_3—TiO_2$.

18. A method for fabricating a magnetic-dielectric assembly comprising acts of:

applying an adhesive to at least a portion of at least one of an interior surface of a dielectric ceramic annular cylinder and at least a portion of a surface of a magnetic ceramic rod, the adhesive including a ceramic material;

assembling the magnetic ceramic rod coaxially inside the dielectric ceramic annular cylinder to form the magnetic-dielectric assembly; and cutting the magnetic-dielectric assembly to form at least one magnetic-dielectric disc assembly.

19. The method of claim 18 wherein the adhesive further includes an epoxy matrix.

20. The method of claim 19 wherein the epoxy matrix has a dielectric constant lower than a dielectric constant of the ceramic material.

21. The method of claim 19 wherein the epoxy matrix has a thermal conductivity lower than a thermal conductivity of the ceramic material.

22. The method of claim 18 wherein the act of cutting the magnetic-dielectric assembly includes sawing the magnetic-dielectric assembly.

23. The method of claim 18 wherein the act of cutting the magnetic-dielectric assembly includes removing adhesive from a blade of a saw with the ceramic material.

24. The method of claim 18 wherein the at least one magnetic-dielectric disc assembly varies in thickness by less than 0.025 mm after cutting and before any further processing.

25. The method of claim 18 further comprising an act of selecting an adhesive matrix and the ceramic material to provide the adhesive with a dielectric constant such that an insertion loss at a frequency of 900 MHz of a microwave isolator including the at least one magnetic-dielectric disc assembly is decreased by about 0.2 decibels relative to an assembly of substantially the same materials except having an adhesive free of the ceramic material.

26. The method of claim 18 wherein the magnetic ceramic rod includes yttrium-iron-garnet.

27. The method of claim 18 wherein the dielectric ceramic annular cylinder includes $MgO—CaO—ZnO—Al_2O_3—TiO_2$.

* * * * *

UNITED STATES PATENT AND TRADEMARK OFFICE

CERTIFICATE OF CORRECTION

PATENT NO. : 8,282,763 B2
APPLICATION NO. : 13/087975
DATED : October 9, 2012
INVENTOR(S) : Cruickshank et al.

It is certified that error appears in the above-identified patent and that said Letters Patent is hereby corrected as shown below:

In claim 3, line 1, between the words “wherein” and “epoxy” please add the word --the--.

Signed and Sealed this
Fourth Day of December, 2012

David J. Kappos
*Director of the United States Patent and Trademark Office*

UNITED STATES PATENT AND TRADEMARK OFFICE

CERTIFICATE OF CORRECTION

PATENT NO. : 8,282,763 B2
APPLICATION NO. : 13/087975
DATED : October 9, 2012
INVENTOR(S) : Cruickshank et al.

It is certified that error appears in the above-identified patent and that said Letters Patent is hereby corrected as shown below:

Column 11, line 21 (claim 3, line 1) between the words "wherein" and "epoxy" please add the word --the--.

This certificate supersedes the Certificate of Correction issued December 4, 2012.

Signed and Sealed this
First Day of January, 2013

David J. Kappos
*Director of the United States Patent and Trademark Office*